B. G. LAMME.
TWO SPEED INDUCTION MOTOR WINDING.
APPLICATION FILED JAN. 24, 1914.

1,158,512.  Patented Nov. 2, 1915.

WITNESSES:
Q. J. Fitzgerald
J. R. Langley.

INVENTOR
Benjamin G. Lamme
BY
Wesley G. Carr
ATTORNEY

UNITED STATES PATENT OFFICE.

BENJAMIN G. LAMME, OF PITTSBURGH, PENNSYLVANIA, ASSIGNOR TO WESTINGHOUSE ELECTRIC AND MANUFACTURING COMPANY, A CORPORATION OF PENNSYLVANIA.

TWO-SPEED INDUCTION-MOTOR WINDING.

1,158,512.     Specification of Letters Patent.     Patented Nov. 2, 1915.

Application filed January 24, 1914. Serial No. 814,061.

*To all whom it may concern:*

Be it known that I, BENJAMIN G. LAMME, a citizen of the United States, and a resident of Pittsburgh, in the county of Allegheny and State of Pennsylvania, have invented a new and useful Improvement in Two-Speed Induction-Motor Windings, of which the following is a specification.

My invention relates to windings for induction motors, and it has for its object to provide a simple and effective means for adapting induction motors for satisfactory operation at more than one speed.

It is well known that more than one operating speed of an induction motor may be obtained by varying the number of magnetic poles. Variations in speed have, in some cases, been obtained by varying the relation of sections of windings so as to connect them in series or in parallel, but, with this arrangement, a large number of conductors and contact members are required to control the connections.

I have provided a motor having two separate and distinct primary windings which may have any desired arrangement relatively to the slots in the primary member of the motor. One of the windings may consist of coils of the ordinary standard diamond winding which have any desired throw or pitch. The other winding comprises coils of special construction which are provided with connectors that permit the coils to have a throw or pitch differing from the throw of the other coils by any desired number of slots. By properly arranging the two windings, the speeds produced by their respective use may bear any desired ratio to each other. The use of a large number of conductors and contact devices is avoided as it is only necessary to change the connection from the terminals of one winding to the terminals of the other in order to change the speed of the motor.

Figure 1:
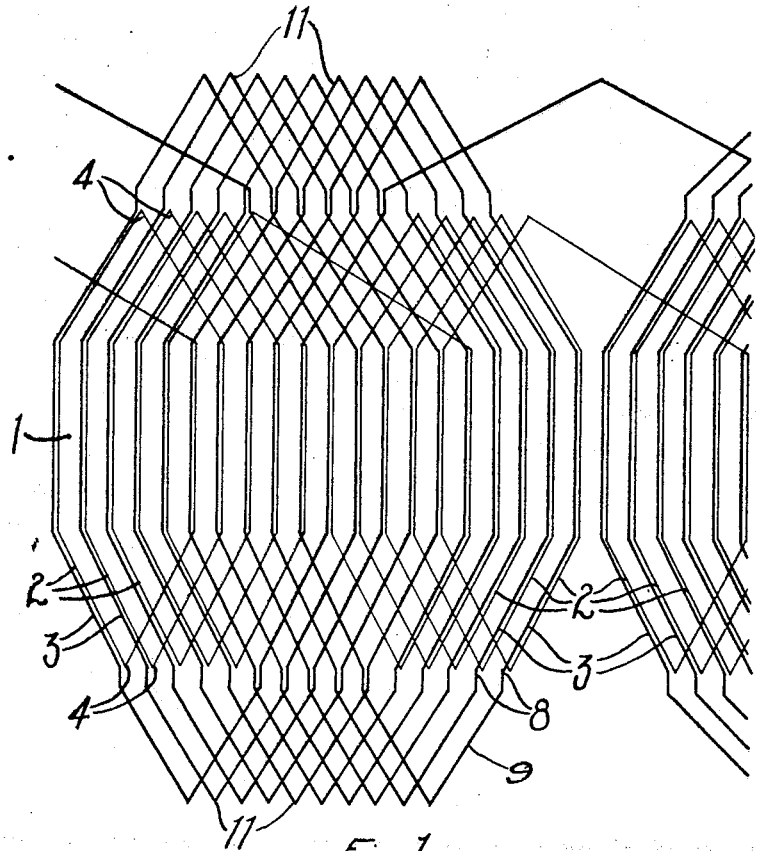
Figure 2:
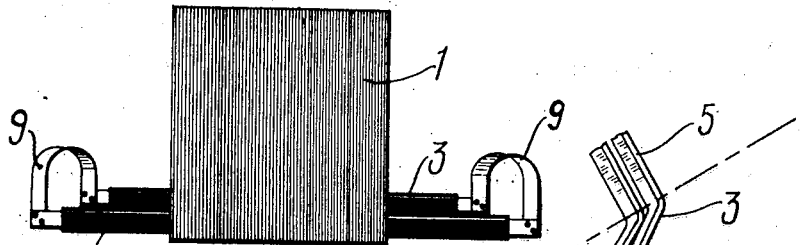
Figure 3:
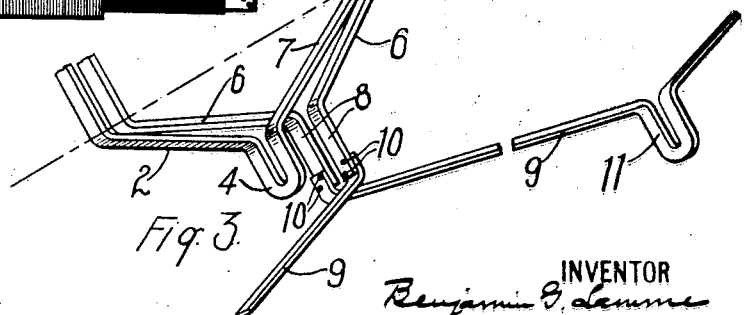

In the accompanying drawings, Figure 1 is a diagrammatic view of a portion of the primary member of an induction motor constructed in accordance with my invention. Fig. 2 is a sectional view in elevation of the primary member illustrating the manner of connecting the coils of one winding. Fig. 3 is a view in perspective of a portion of the end structure of the coils.

Referring to Fig. 1, an induction motor, which may be of the squirrel cage type, is provided with a primary member 1. Only a portion of the primary member 1 is shown, the remainder being broken away as unnecessary to a complete understanding of my invention. The particular forms of windings shown in the drawings are illustrative only, the number of slots employed and the number of poles produced by the several windings forming no part of my present invention.

The primary member 1 is provided with two windings, one, comprising coils 2 of the ordinary diamond winding which may have, for example, a forward throw or pitch of six slots and a backward pitch of five slots, and the other, comprising coils 3 of a special construction and having, for example, a forward pitch of eleven slots and a backward pitch of ten slots.

The coils 2 are each provided with the usual simple diamond end portion comprising short-throw conductors 7 and an inverting twist or loop 4. The coils 3 are each provided with a composite end portion comprising conductors 6 and 8 alternating with the conductors 7 and 4, respectively, of the coils 2 and a special connector 9 provided with an inverting loop or twist 11. The connectors 9 are attached to the members 8 by any suitable means, as, for example, by rivets 10 and their length is determined by the throw or pitch of the winding made up by the coils 3.

The conductors 5 may be formed by dividing coils of a construction similar to that of the coils 2 at the midpoint of the loop portions 4, and then bending the curved portion of the half-loops to form the straight end portion 8 or the same forms may be employed to shape the several conductors 5 that were used in shaping the coils 2.

By means of this construction, I am enabled to provide a motor having two windings for producing speeds that may have any desired ratio to each other. The coils of one winding may be of a standard form and the coils of the other winding may be very similar except that they comprise a special connector in order to permit a pitch differing by any desired number of slots from the pitch of the one winding.

By arranging the windings to occupy the same slots, self-induction is reduced to a minimum. The alternation or "sandwich- "ing" of the conductors of the respective windings at the ends of the armature provides an inactive member between each pair of active members and all conductors are effective in dissipating heat while the motor is in operation.

While I have shown the windings as occupying the same slots in the rotor, this arrangement is illustrative only and may be varied within the scope of the appended claims.

I claim as my invention:

1. In an induction motor, the combination with a core member having a plurality of slots, of a plurality of windings of different pitch in said slots, one of said windings comprising coils having continuous end portions, and the other of said windings comprising conductors, and connectors for joining the ends of said conductors.

2. In an induction motor, the combination with a core member having a plurality of slots, of a plurality of windings in said slots, each of said windings comprising coils having substantially parallel end portions, and the coils of one of said windings comprising connectors in its end portions.

3. In an induction motor, the combination with a core member having a plurality of slots, of a plurality of windings of different pitch in said slots, one of said windings having closed end portions, and the other of said windings having composite end portions in part similar in shape to the end portions of the other winding, and connectors for completing said composite end portions.

4. In an induction motor, the combination with a core member having a plurality of slots, of a winding comprising a plurality of coils in said slots and having closed end portions, a plurality of conductors in said slots, and connectors for forming the end portions of said conductors to constitute a winding differing in pitch from the other windings.

5. In an induction motor, the combination with a core member having a plurality of slots, of a plurality of windings in said slots, one of said windings comprising coils having closed end portions, and the other of said windings comprising conductors having composite end portions in part substantially parallel to said closed end portions, and connectors for completing said composite end portions.

In testimony whereof, I have hereunto subscribed my name this 17th day of Jan. 1914.

BENJ. G. LAMME.

Witnesses:
E. LIVINGSTONE,
B. B. HINES.